Figure 1:
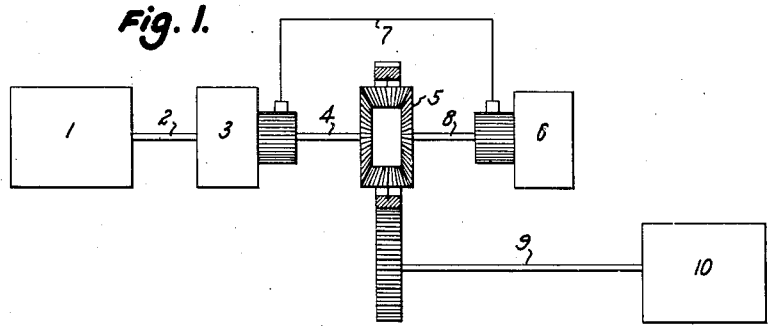

Aug. 23, 1949.  M. WANNER  2,480,065
PLURAL ELECTRIC MOTOR TRANSMISSION SYSTEM
Filed April 4, 1945  3 Sheets-Sheet 1

Inventor:
Maurice Wanner,
By
Pierce & Scheffler,
Attorneys.

Inventor:
Maurice Wanner,
By Pierce & Scheffler,
Attorneys

Aug. 23, 1949.                M. WANNER                 2,480,065
             PLURAL ELECTRIC MOTOR TRANSMISSION SYSTEM
Filed April 4, 1945                          3 Sheets-Sheet 3
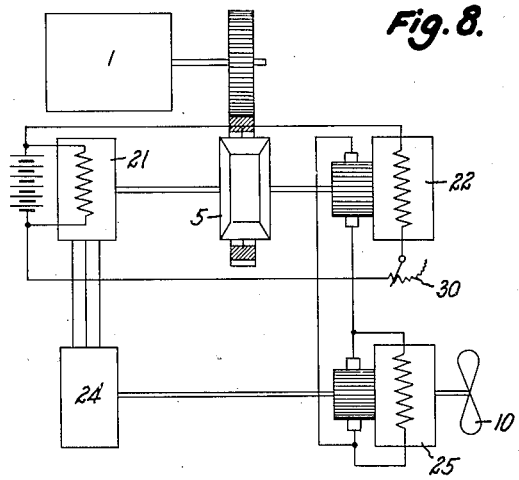
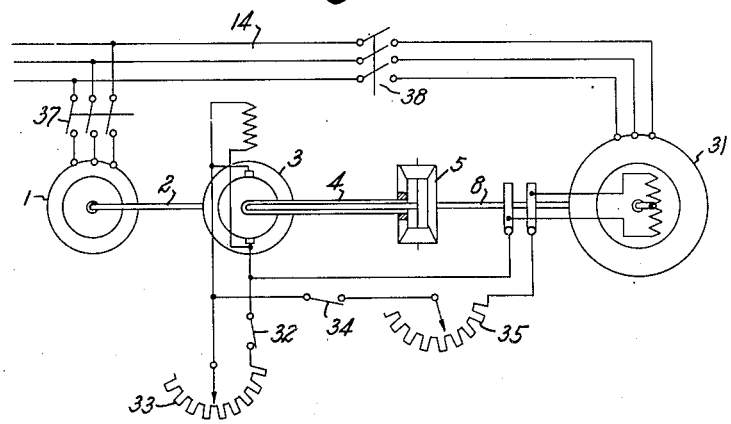
Inventor:
Maurice Wanner,
By Pierce & Scheffler,
Attorneys.

Patented Aug. 23, 1949

2,480,065

UNITED STATES PATENT OFFICE 2,480,065

PLURAL ELECTRIC MOTOR TRANSMISSION SYSTEM

Maurice Wanner, Wettingen, Switzerland

Application April 4, 1945, Serial No. 586,469
In Switzerland February 12, 1944

2 Claims. (Cl. 318—46)

The present invention concerns a new arrangement for power transmission with a speed-changing gear, that is with a regulation of the speed, torque or power of the transmitted energy, whereby one, two or all three of these values can be regulated simultaneously or independently of each other.

In many cases it is necessary to introduce a device between the motor and the driven machine in order to make the speed of the motor variable or more or less independent of that of the driven machine. Some machines require a regulation operating within wide limits whilst others, on the contrary, require a very accurate regulation of the speed. There are also some machines which require an exactly controlled power supply.

Only certain electric motors permit a direct regulation of their speed within wide limits. Motors with mechanical or thermal drive, of which there are a large number, are, however, difficult to regulate at speeds which vary very greatly or correspond to optimum efficiency. The starting torque is also often zero or negative so that regulation can only commence after a certain minimum speed has been reached; at this instant there must be a device available which enables the driven machine to be started and put into operation.

The problem of transmitting mechanical power by means of a speed-changing gear has so far been solved by the following three fundamentally different methods:

(1) Transmission of the mechanical power by purely mechanical means with a mechanical speed-changing gear.

(2) Transmission of the mechanical power by purely electrical means with an electrical speed-changing gear.

(3) Transmission of the mechanical power by electrical and mechanical means simultaneously with speed-changing gears, whereby the power which is to be transmitted passes successively through the electrical and mechanical means which are connected in series in the path of the power passing from the motor or motors to the power consuming machine.

The first part of the present invention concerns a so-called "electro-mechanical differential" device according to a fourth method of power transmission with parallel-connected electrical and mechanical transmission means. The second part of the invention concerns an "electro-mechanical differential" device according to a combined fifth method with simultaneous series and parallel-connected electrical and mechanical transmission means. The power which is to be transmitted passes simultaneously and only partly through the individual electrical and mechanical devices which are located in the path traversed by the power on its way from the motor or sets of motors to one or more power consuming machines. The invention is characterised by the feature that the power is either divided or added by means of a so-called differential gear, reverse operation being effected by directly coupling one or more electric machines to the shaft of the motor or power receiver. The power division can also be effected by means of a first differential, whilst a second differential is provided for the power summation after transmission over separate channels has occurred.

The desired change in speed is obtained by regulation or by means of a suitable device, either for a part or several parts of the power or even the whole power, simultaneously or otherwise.

In the accompanying drawings,

Fig. 1 is a diagrammatic view showing one variable speed drive constructed in accordance with the principles of the invention and Figs. 2 to 9 are likewise diagrammatic views illustrating modified variable speed drives which incorporate the invention.

Fig. 1 of the accompanying drawing shows in a diagrammatic manner one application of the electro-mechanical differential according to the invention. In the figure reference number 1 indicates a prime mover whose shaft 2 drives a dynamoelectric machine 3 and also one of the shafts 4 of the differential gear 5; 6 is a further electric machine which is connected electrically by means of conductor 7 with electric machine 3 and mechanically with a second shaft 8 of gear 5. A third shaft 9 mechanically coupled to differential 5 drives the machine 10 the speed of which is to be regulated.

Figure 2:
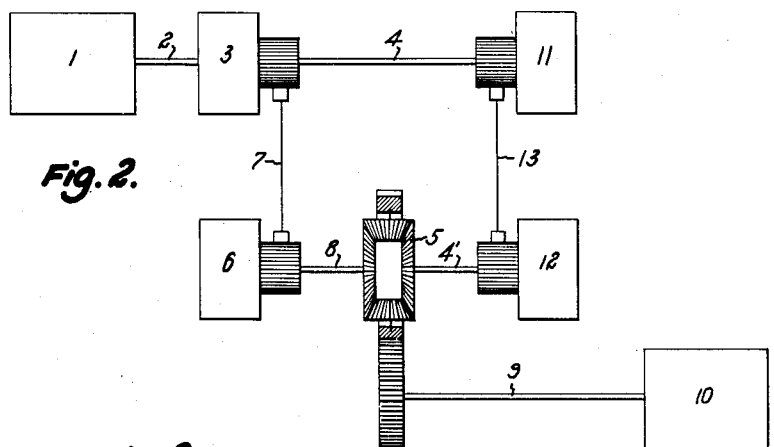

Fig. 2 illustrates a further application of the invention where there is no mechanical connection between prime mover 1 and the driven machine 10. In this case a second electrical transmission comprising the dynamoelectric machines 11 and 12 and conductor 13 replaces the direct coupling of shaft 4 of the differential gear with the shaft 2 of prime mover 1.

It is assumed that in Fig. 1, prime mover 1 represents an automobile motor and that the electro-mechanical differential drives a car whose rear axle is connected to the driving wheels and represents the machine which is to be driven. Prime mover 1 is started by electrical machine 3 which is supplied momentarily from a storage battery; prime mover 1 can be put into operation even when the car is at a standstill, because machine 3, shafts 2 and 4, and one of the planet wheels of differential gear 5 can run at the same speed as motor 1. Assuming that this speed is constant and equal to $n_1$, the second planet wheel, shaft 8 and electrical machine 6 will then rotate at a speed $n_2 = -n_1$.

The device which is designated as a differential gear consists of a combination of gear wheels with four movements of rotation. One of the main rational movements is the algebraic sum of both others, and each of the movements is normally associated with one of the three shafts of the differential gear. The fourth rotation movement generally not visible from outside, although a function of the three movements already mentioned, is the planet wheel movement. If N is the speed of rotation of the planet wheels, then the following equations are obtained for these rotations:

$$N = K_1 \frac{n_1 + n_2}{2}$$

$$n_3 = K_2 (n_1 - n_2)$$

If two movements are determined, then both the others can be found. It is impossible to assume optional values for three of the rotation movements because the above equations must be satisfied.

It is assumed that the car is at a standstill so that $N=0$, and for the sake of simplicity it can also be assumed that constants $K_1$ and $K_2 = 1$.

Machines 3 and 6 can for instance be identical direct-current commutator machines, whose excitation with the same absolute speed produces the same terminal voltage:

$$n_1 = -n_2$$
$$/n_1/ = /n_2/$$

As soon as the same voltage is reached both machines are connected electrically in parallel.

The excitation of machine 3 has now to be decreased; since the speed of this machine is $n_1$ the voltage $E'$ induced by it will be less than the voltage E previously induced. Since this machine 3 is connected to the terminals of machine 6 whose speed is $-n_1$ and which has an induced voltage E, machine 3 operates as a motor and produces a positive torque $M_3$ on shaft 4. Machine 6 on the other hand operates as a generator and produces a negative torque $-M_6$ on shaft 8 which rotates at a speed $-n_1$. Since the negative torque affects shaft 8 and this latter rotates in a negative sense, the power of machine 6 drives the planet wheels of differential gear 5 in the positive, that is the same direction as the electrical machine 3 which is operating as a motor. The resultant torque M is transmitted by the planet wheels to the gear casing and from this latter to shaft 9; it is the sum of the torques of the electrical machines 3 and 6, increased by the additional torque of motor 1 which equalizes the losses and friction. When the car is stationary, on account of the equilibrium of the differential gear $$M_1 + M_3 = M_6$$

Total torque $M = M_1 + M_3 + M_6 = 2M_6$.

If the field of machine 3 is gradually reduced still further, torque M increases and as soon as it exceeds the moment of resistance, the car begins to move.

It is now assumed that the field of machine 3 is weakened to half its value whilst that of machine 6 maintains its original value. The terminal voltage of machine 3 with speed $n_1$ then becomes $E/2$; the speed $n_2$ of machine 6 must in this case be $n_2 = -n_1$ corresponding to its terminal voltage, losses being neglected.

Therefore at this instant the speed N of planet wheels of differential 5 is $$N = \frac{n_1 + n_2}{2} = \frac{n_1 - \frac{n_1}{2}}{2} = \frac{n_1}{4}$$

N is proportional to the car speed which amounts to 25% of the normal speed.

In accordance with the field strengths $$2M_3 = M_6$$

and according to the equilibrium of the differential $$M_1 + M_3 = M_6$$

The torque $M_1$ of the prime mover 1 is therefore:

$$M_1 = -\frac{M_6}{2} = \frac{M}{4}$$

and the total torque:

$$M = 2M_6$$

The excitation of machine 3 is now still further weakened. With zero excitation voltage $E' = 0$, and the velocity $n_2$ of machine 6 whose excitation has not been weakened must also become zero. This gives the following result:

$$N = \frac{n_1 + n_2}{2} = \frac{n_1}{2} = \sim$$

the car speed, which thus represents 50% normal speed. Torque $M_3$ becomes zero, due to the zero excitation of machine 3. The equilibrium of the differential gear makes $M_1 = M_6$ $$M = M_1 + M_3 + M_6 = 2M_6$$

$$M_1 = \frac{M}{2}$$

At this instant one half of the torque for driving the car is obtained mechanically from prime mover 1 and the other half electrically through machine 6.

If machine 3 is now excited in the opposite sense, that is in the same sense as machine 6, then the latter machine must run in the opposite direction, that is in accordance with its torque. Machine 6 is then a motor and machine 3 a generator which thus produces a negative torque.

If it is now assumed that the excitation of machine 3 has reached its maximum value and equals that of machine 6.

Then $$n_1 = n_2$$

and $$N = \frac{n_1 + n_2}{2} = n_1$$

Since both machines are fully excited their torques are equal and $M_3 = M_6$. The equilibrium of the differential gear results in:

$$M_1 - M_3 = M_6$$

and $$M = M_1 - M_3 + M_6 = 2M_6$$

The torque produced by motor 1 reaches its maximum value $M_1 = M = 2M_6$.

The foregoing observations thus show that the torque M of the device according to the invention has a value equal to $2M_6$, independently of the speed. Since the torque of both electrical machines is equal, calculations show that each of these machines must be designed for half the torque necessary for driving the car. Due to the invention it is thus theoretically possible to achieve a transmission with only half the electrical machine power required by the arrangements used hitherto.

Fig. 2 shows another application of the electro-mechanical differential gear according to the invention. It differs from that shown in Fig. 1 in that the shaft 4 is replaced by two shafts 4 and 4', both shafts being connected to a new electrical transmission which is independent of the transmissions hitherto mentioned. If this connection is established by means of two synchronous machines which are connected together, then the observations made in connection with Fig. 1 also apply here. If this transmission is also variable then a still greater range of speed variation can be obtained.

The electro-mechanical differential gear shown in Fig. 1 is now compared with the main mechanical power transmission systems known up to the present. Compared with a purely mechanical transmission system the electro-mechanical differential transmission system possesses the advantage of a continuous and precise regulation of the torque, speed and power. The efficiency is lower than with purely mechanical transmission; nevertheless the closer the speed regulating limits are the better it will be, because at least in the case of some possible arrangements a slight variation of the regulation can be taken into account and the larger part of the total power transmitted mechanically, whilst the electrically transmitted part is correspondingly reduced.

Compared with the usual electrical transmission the electro-mechanical differential transmission has the advantage that the power of the installed machines required for the regulation is smaller, this power being less than the total power which is to be transmitted. The power of the machines used for the regulation decreases as the speed limits approach each other. This system possesses the same flexibility and an even greater precision and better efficiency than a purely electrical transmission. The speed limits can be varied by influencing the mechanical part of the transmission, for instance by means of a speed-changing gear, although the use of such a complex system is only very rarely necessary.

Compared with electrical and mechanical transmission systems with various devices arranged in series, electro-mechanical differential power transmission has a better efficiency and the arrangement is also lighter and less expensive.

The fundamental principle of the electro-mechanical differential system enables a larger number of applications and various combinations to be achieved and results in a considerable number of modified forms.

Figure 3:
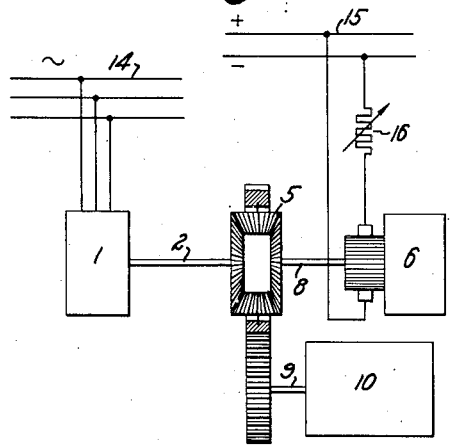

Of course in accordance with the arrangement shown in Fig. 2 a complex machine can also be driven by means of an electro-mechanical differential gear. In this case one or more parallel-connected electrical transmission systems are used. Often it is expedient to employ a direct-current system for the controllable part of the transmission and an alternating current system with synchronous or asynchronous machines for that part of the transmission which is not regulated; this latter part of the transmission system can in many cases transmit more than half the total power. Such a case is illustrated in Fig. 3, where the machine 10 which is to be driven and whose speed is to be regulated receives its constant power from the alternating current network 14 by means of the alternating current motor 1 and shaft 2, whilst the variable part of the power is supplied from the direct current network 15 by means of the direct current motor 6 and shaft 8. Both motors 1 and 6 actuate the differential gear 5 whose casing is coupled to machine 10 by means of shaft 9, whereby the machine 10 can be a machine tool, pump, compressor, ventilator or other machine. A regulating resistance 16 can be located in the supply lead to machine 6.

Figure 4:
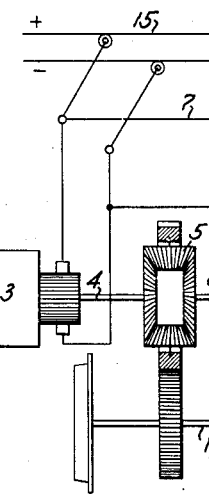

The arrangement according to the invention has for instance according to Fig. 4 to drive a trolley bus which is supplied from a trolley wire 15, E being the network voltage. Two electrical machines 3 and 6, each with half the power and shunt or compound excitation, are connected to the sun wheels of a differential gear 5 whose casing is mechanically coupled to the driving axle 17 of the bus. The field regulation of these machines can reach ±83%. When starting, these machines have a speed $n_1$ and $-n_1$ respectively. If the field of the machine which rotates in the positive direction is weakened and the field of the machine rotating in the negative direction is strengthened, the vehicle can attain the following speed:

$$\frac{n_1}{0.67} + \left(-\frac{n_1}{1.33}\right) = \frac{1.50n_1 - 0.75n_1}{2} = 0.375n_1$$

whereby both machines 3 and 6 are connected in parallel. If these machines are connected in series with maximum excitation, the torque always acts in the same direction. These machines 33% over-excited and running with an additional speed of $0.75n_1$, induce exactly the voltage of the network. When their excitation is weakened so that the field strengths are reduced from 1.33 to 0.67 times the normal value, the speed of the vehicle increases from 0.375 to 0.75 times the rated speed. At this instant both machines can be connected in parallel again, but both in the positive sense and with maximum overexcitation. By regulating the field strength it is thus possible to vary the speed between 0.375 and 1.5 times the rated speed.

The speed can also be regulated by combining several electro-mechanical differentials operating in parallel.

Figure 5:
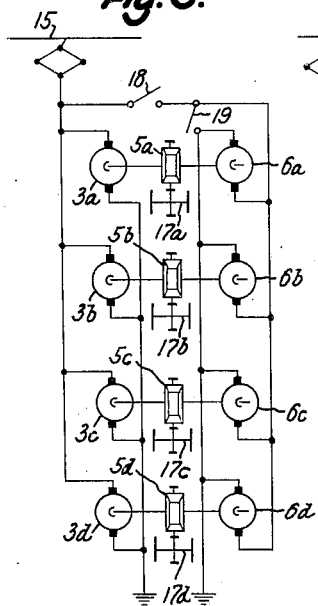

An example of this is the direct-current locomotive for 1500 volt with four driving axles shown in Fig. 5, where each axle is driven through an electro-mechanical differential gear by two electrical shunt or compound motors. Each machine is coupled to a sun wheel of a differential gear whose casing is coupled to the driving axle. The first group is formed by four electrical machines $3a$–$3d$ each of which is associated with one of the gears $5a$–$5d$. The four machines are continuously connected to the network 15. The remaining electrical machines $6a$–$6d$ form the speed regulating group whereby coarse regulation is achieved by combination of the supply means, and fine regulation by means of field regulation of the eight machines. The various speeds are attained as follows.

*Zero speed:*—The four electrical machines $3a$–$3d$ of the first group are with the aid of a suitable device and with open switches 18 and 19 started at no-load and connected to the network 15. They rotate in the direction of motion of the locomotive with a speed $n$ and normal exciting field; the four machines 6a–6d of the regulating group then have a speed $-n$ and are connected in parallel; as soon as the excitation attains its normal value these machines are connected to network 15 by closing switch 18. Since their E. M. F. equals the network voltage, no current flows. The machines of the regulating group are then over-excited; they have a tendency to run slower and operate as generators. They run in the direction opposite to that of the driving wheels and produce a positive torque on the sun wheels of the differential gears 5a–5d, which must be compensated by machines 3a–3d of the first group. These are retarded and thus operate automatically as motors; when the over-excitation reaches its limit the fine regulation is put into operation due to the field strength of the first group being reduced.

Speed $N_1 = 2/8 N$.—When the locomotive reaches ⅛ of its rated value by this means, two machines each of the regulating group 6a–6d are connected in series by under-exciting them and over-exciting the motors of the first group 3a–3d. Normal excitation is then gradually restored and as soon as this is reached the locomotive runs with its first speed $N_1 = 2/8 N = ¼ N$.

By means of a further variation of the excitation the locomotive attains a speed higher than $N_1$; at the end of the field strength regulation the connections of the regulating group 6a–6d can be altered.

Speed $N_2 = 3/8 N$.—The four machines of the regulating group 6a–6d are connected in series to the network and operate as generators with a speed $$-\frac{n}{4}$$

This speed is exceeded by means of field regulation.

Speed $N_3 = 4/8 N = ½ N$.—The four machines of the regulating group 6a–6d are short-circuited by means of switch 19 or mechanically braked, both methods being combined if desired. Their speed is thus zero or approximately zero. At this instant the locomotive runs at half speed, whereby only half the machines, namely 3a–3d, are in operation, but with the total rated torque. This speed can be used for driving goods trains because it is economical due to the reduced wear and tear.

Speed $N_4 = 5/8 N$.—The four machines of the regulating group 6a–6d are connected in series as motors; they run with normal excitation at a speed $$+\frac{n}{4}$$

Speed $N_5 = 6/8 N = ¾ N$.—Each pair of the four machines of the regulating group 6a–6d is connected in series and operate as motors; their speed is $$+\frac{n}{2}$$

Speed $N_6 = 8/8 N = N$.—The four machines of the regulating group 6a–6d are connected in parallel as motors. The locomotive runs at its rated speed, driven by the eight machines, and each machine runs at a speed $+n$.

Figure 6:
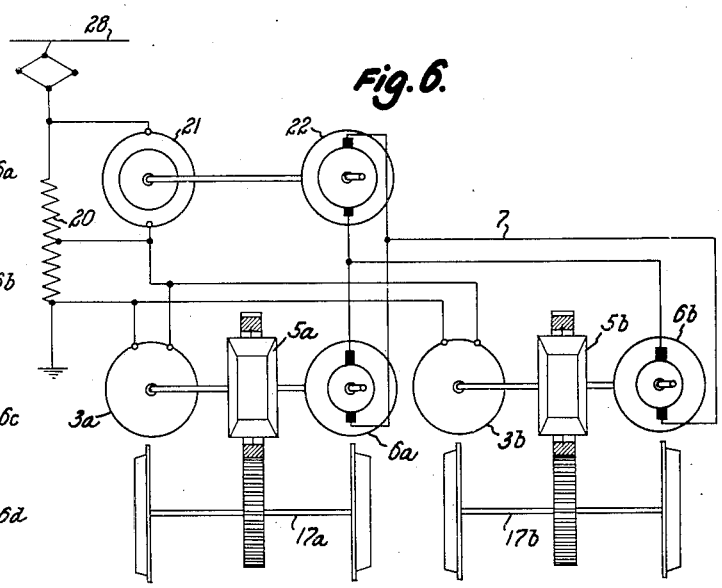

Fig. 6 shows a further constructional example where a single phase 50 or 60 cycle locomotive is operated with the arrangement according to the invention. Each driving axle 17a, 17b is equipped with an electro-mechanical differential gear 5a, 5b respectively driven by two electrical machines, whereby each of the electrical machines is for instance coupled to a sun wheel. One of the electrical machines 3a, 3b can be a synchronous or asynchronous machine which is fed directly or indirectly over a transformer 20 from the 50 or 60 cycle network 28. The remaining machines 6a, 6b can for instance be direct current machines which are supplied over a rectifier or converter set, comprising a synchronous machine 21 and a direct current machine 22. The power supplied by this set 21, 22 need not exceed half the installed power of the locomotive if the regulation is undertaken without momentarily overloading the machines. Transformer 20 also only needs to be dimensioned for ¼ of the locomotive power. If an overload or an excessive speed is taken into account when starting, then it is possible to dimension the synchronous machine 21 for ⅔ and the direct current machine 22 for ⅓ the normal power of the locomotive.

Figure 7:
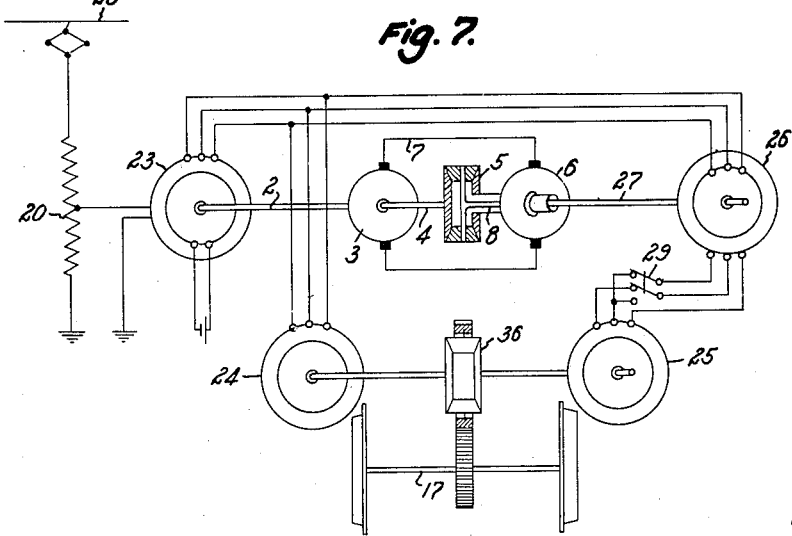

Fig. 7 also shows an electric locomotive which is supplied from a high voltage single phase network 28 at 50 or 60 cycles. A synchronous converter 23 is connected to transformer 20 which converts the single phase current into three phase current and thus transmits electrically the greater part of the supplied power, for instance ¾; the rest, for instance ¼, of the incoming power is used by the machine as a motor and transmitted mechanically by shaft 2 to the direct current machine 3 and over shaft 4 to the sun wheel of differential gear 5. The electrical power from the converter is again subdivided by supplying on the alternating current side the traction motors 24, 25, which may be synchronous or asynchronous machines, and actuate the driving axle 17 over differential gear 36. Traction motor 24 is supplied directly at network frequency from converter 23 with half the total power, and the other traction motor is supplied with ¼ the total power at a higher frequency over frequency converter 26 which is driven mechanically over shaft 27 by direct current machine 6 and the other sun wheel of differential gear 5 and is also supplied electrically with a further quarter of the power from phase converter 23. Machines 3 and 6 together with differential gear 5 form the regulating set, and under the aforementioned assumptions each machine need only be dimensioned for 1/16 of the total locomotive power. Frequency converter 26 absorbs ¼ of the power electrically and ¼ of the power mechanically and supplies ½ the power, for instance at double the network frequency, electrically to traction motor 25. In the supply lead to traction motor 25 there is a change-over switch 29 which should be operated preferably when motor 25 is at a standstill and serves to reverse the direction of rotation.

Fig. 8 shows a turbo- or Diesel-electric ship's drive with a regulation of the ship's speed by means of a differential gear according to the invention. The prime mover, which may be a steam engine, steam turbine or diesel motor, actuates the casing of differential gear 5 and drives by means of the latter two electrical generators, the alternating current synchronous generator 21, and the direct current generator 22. Each generator supplies a motor with current for driving the common propeller shaft 9 together with the propeller 10. Motor 24 is a synchronous or asynchronous motor and is rigidly coupled to the other motor 25 which is a direct current motor. The ship's speed can be regulated merely by moving the field regulator 30 of machine 22.

Fig. 9 shows an arrangement for starting and synchronising a synchronous motor. In this case an asynchronous motor 1 connected to the alternating current supply network 14 and serving as the starting motor is connected by shaft 2 to the casing of differential gear 5. One sun wheel of this gear is coupled by the hollow shaft 4 to the direct current machine 3, whilst the second sun wheel is coupled by means of shaft 8 with the synchronous motor 31 which is to be started. Since at first synchronous motor 31 is at a standstill, when the starting motor 1 is put into operation, the direct current machine 3, which also supplies the excitation of synchronous motor 31, runs up to double its speed. As shown in the drawing this can be self-excited or excited by an auxiliary machine. If after closing switch 32 machine 3 is connected to variable resistance 33, its speed drops and synchronous motor 31 gradually commences to run at a speed equal to the difference of the speeds of rotation of shafts 2 and 4. When motor 31 has approximately reached its synchronous speed its field excitation is switched in by means of switch 34 and the voltage of motor 31 is regulated by means of resistance 35 up to the value of the network voltage. When phase coincidence is attained main switch 38 can be closed and asynchronous motor 1 disconnected by means of switch 37 after the load on machine 3 has been removed by opening switch 32.

I claim:

1. In a variable speed drive for locomotives and the like having a plurality of driving axles, a mechanical gear differential for each axle, a pair of dynamo electric machines for each differential, the machines of each pair being each connected to different input gears of the associated differential whilst the driving axle is connected to the output gear of such differential, a power source adapted to supply power continuously to a first group of said machines comprising one machine of each of the several differentials, and control means selectively arranging the remainder of said machines both in parallel and in series and both as motors and generators with respect to said power source.

2. A variable speed drive as defined in claim 1 wherein the machines constituting said first group are of the alternating current type and the said remainder of said machines are of the direct current type energized from the direct current side of a converter set driven from said power source.

MAURICE WANNER.

REFERENCES CITED

The following references are of record in the file of this patent:

UNITED STATES PATENTS

| Number | Name | Date |
|---|---|---|
| 1,083,729 | Collischonn | Jan. 6, 1914 |
| 1,203,664 | Thomas | Nov. 7, 1916 |
| 1,409,061 | Murray | Mar. 7, 1922 |
| 1,593,343 | Merrill | July 20, 1926 |
| 1,706,276 | Zweigbergk | Mar. 19, 1929 |
| 1,828,944 | Rossman | Oct. 27, 1931 |
| 1,881,011 | Wittkuhns | Oct. 4, 1932 |
| 2,045,197 | Neuland | June 23, 1936 |
| 2,384,776 | Trofimov | Sept. 11, 1945 |
| 2,397,062 | Trofimov | Mar. 19, 1946 |

FOREIGN PATENTS

| Number | Country | Date |
|---|---|---|
| 558,334 | France | May 23, 1923 |